United States Patent [19]

Alfke et al.

[11] 4,412,339

[45] Oct. 25, 1983

[54] ZERO-CROSSING INTERPOLATOR TO REDUCE ISOCHRONOUS DISTORTION IN A DIGITAL FSK MODEM

[75] Inventors: Peter H. Alfke, Los Altos Hills; Michael K. Stauffer, Redwood City, both of Calif.

[73] Assignee: Advanced Micro Devices, Inc., Sunnyvale, Calif.

[21] Appl. No.: 305,015

[22] Filed: Sep. 24, 1981

[51] Int. Cl.³ ............................................. H03D 3/18
[52] U.S. Cl. ..................................... 375/95; 364/723; 375/82
[58] Field of Search ............... 328/133; 364/178, 484, 364/485, 486, 514, 701, 702, 723; 375/80, 82, 95, 110

[56] References Cited

U.S. PATENT DOCUMENTS

| | | | |
|---|---|---|---|
| 3,943,346 | 3/1976 | Urkowitz et al. | 364/723 |
| 4,242,755 | 12/1980 | Gauzman | 375/95 |
| 4,313,173 | 1/1982 | Candy et al. | 364/723 |

Primary Examiner—Benedict V. Safourek
Attorney, Agent, or Firm—Patrick T. King; Gary T. Aka

[57] ABSTRACT

In a digital data communication receiver, an apparatus for estimating the time of zero-crossing between successive samples of a continuous frequency shift keyed (FSK) or like zero-crossing signal in a manner more accurate than is provided by the basic sampling clock. The apparatus includes means for sensing a change in sign relative to successive samples of the signal and means responsive to the sensed sign change to interpolate between the values of the respective samples for indicating more accurately the time of occurrence of the zero-crossing prior to the second sample, thereby demodulating the continuous signal.

8 Claims, 3 Drawing Figures

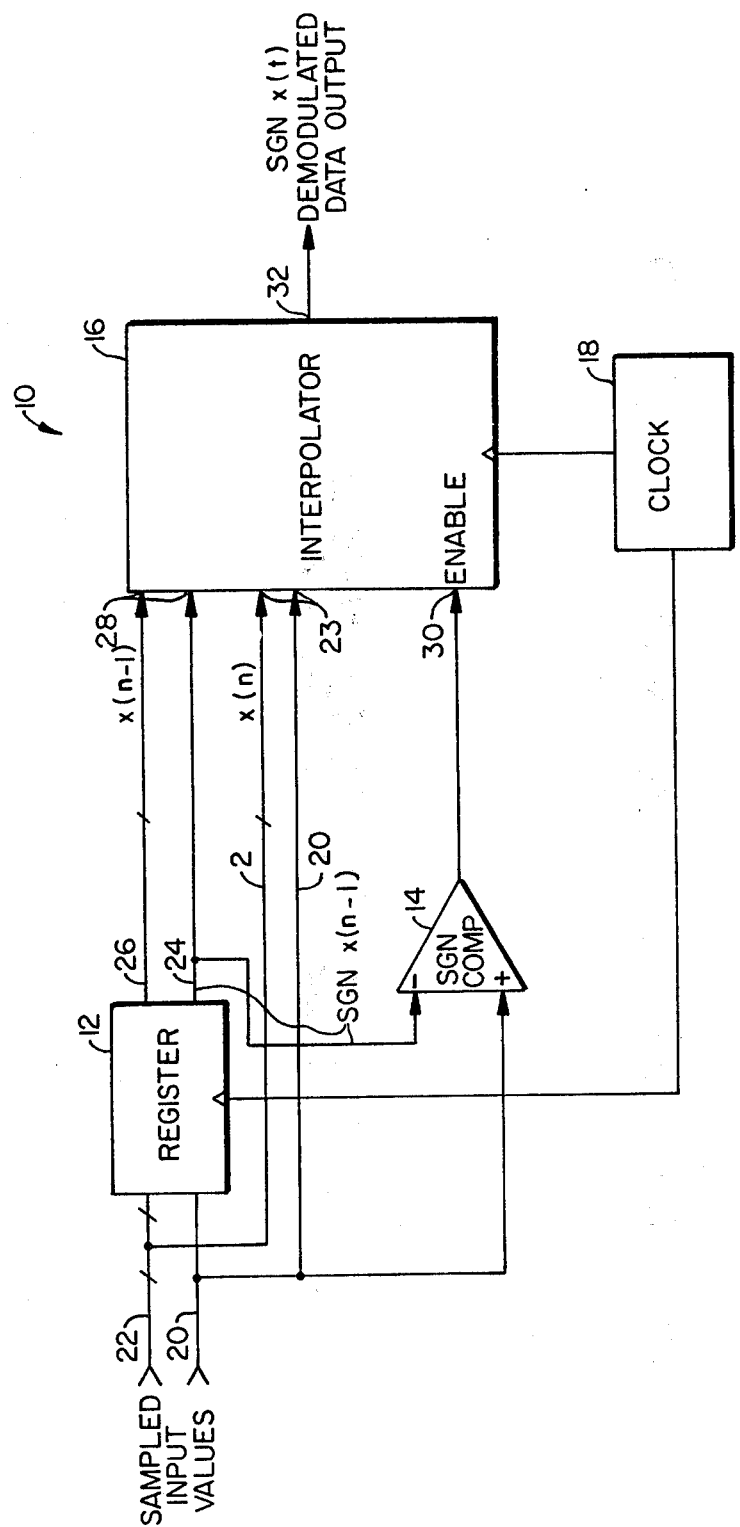
FIG._1.

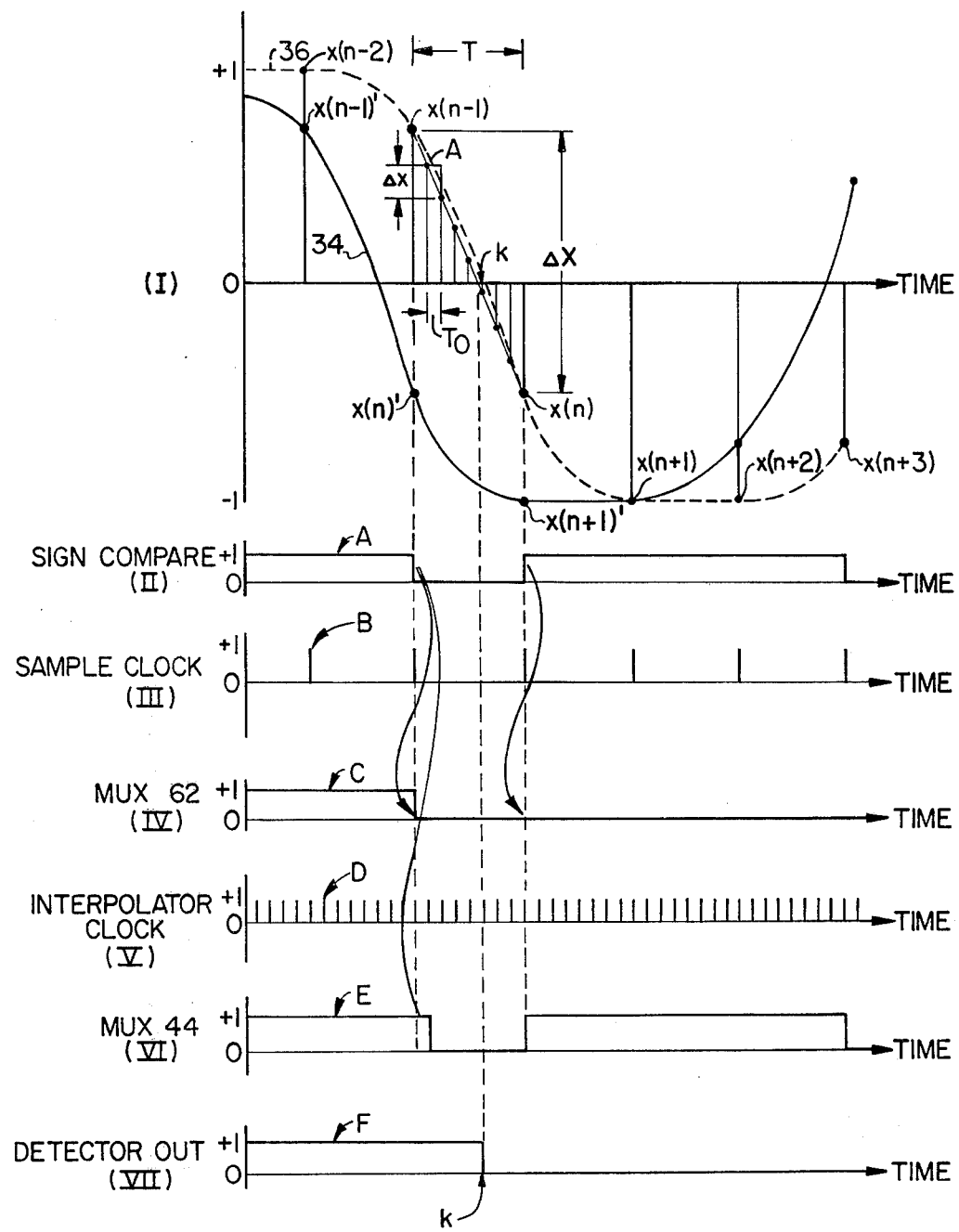
FIG._2.

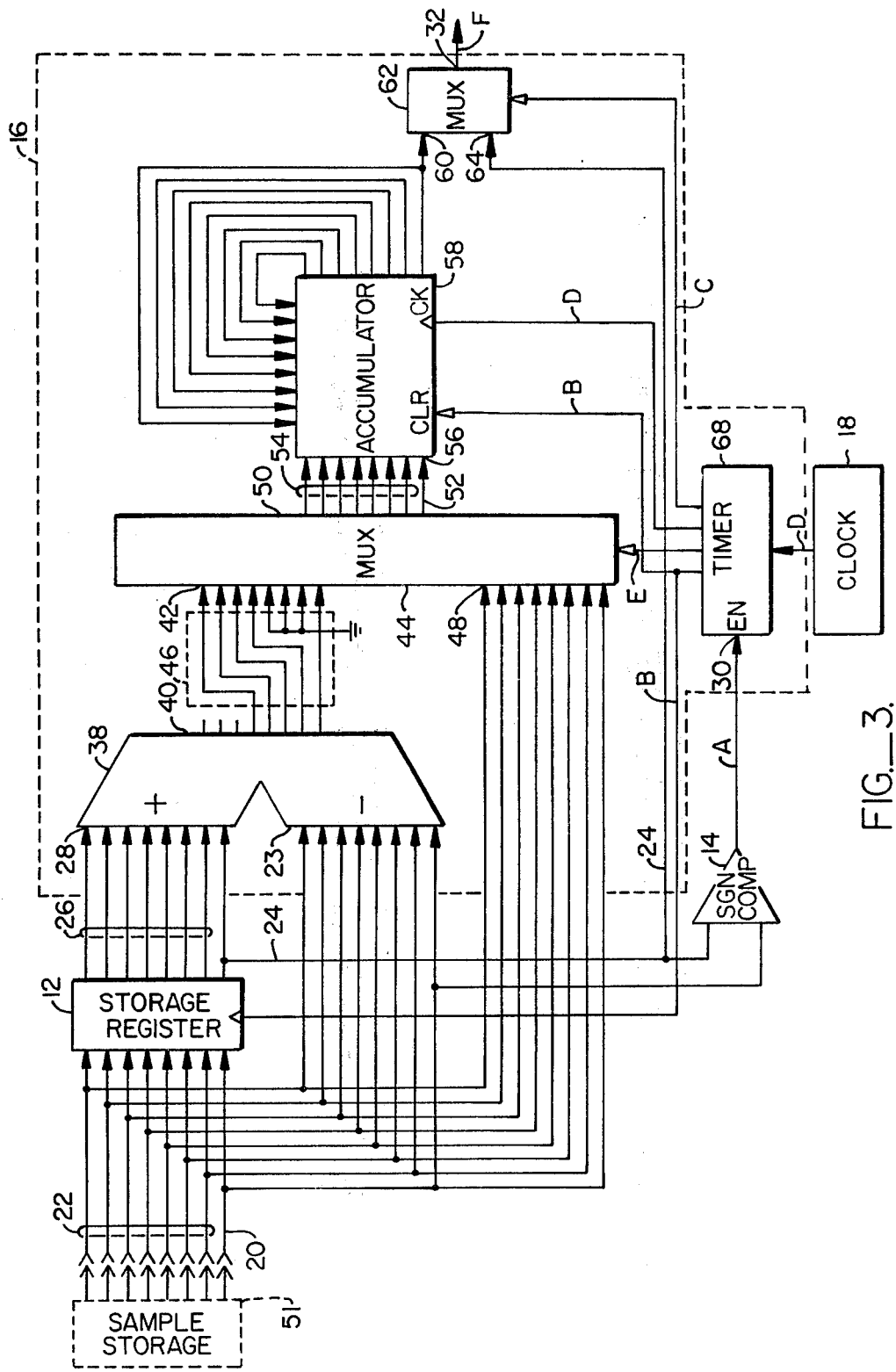
FIG._3.

ZERO-CROSSING INTERPOLATOR TO REDUCE ISOCHRONOUS DISTORTION IN A DIGITAL FSK MODEM

BACKGROUND OF THE INVENTION

1. Field of the Invention

This invention relates to data communication and particularly to a frequency shift keyed (FSK) detection apparatus in which a zero-crossing or change of sign is employed to determine signal state.

The output of a digital FSK detector is a sequence of binary values separated by an interval T. The binary serial information is retrieved by detecting a positive or negative value relative to a zero reference. For an audio band modulator-demodulator (modem), a reasonable value for the time interval T is approximately 130 microseconds. The interval value is generally chosen to minimize the processing power required of the particular filter and detection scheme. The value of the interval T determines the amount of uncertainty which may be tolerated between two successive samples during an interval in which a change of sign occurs. For example, at a K bit per second transmission of an FSK signal, the uncertainty in zero-crossing detection as a percentage of bit time is given by the expression:

$$\frac{T}{(1/K)} \times 100\%.$$

Where for example the interval T is equal to 130 microseconds and the transmission rate is K=1200 bits per second, the uncertainty in the time of zero-crossing is 15.6%. This is a relatively high uncertainty which contributes heavily to jitter, i.e., isochronous distortion, in the decoded signal.

2. DESCRIPTION OF THE PRIOR ART

Heretofore, FSK receivers have commonly been analog signaling devices wherein the received signal is continuously detected and therefore not sampled. Accordingly, the uncertainty contributed by use of a digital sampling technique has not been a concern.

Digital techniques including signal sampling have been employed in other applications. The accepted technique for reducing signal uncertainty is to increase the sampling rate of the signal. A higher sampling rate, however, requires more preprocessing of the signal than is necessary to accurately recover the information in an FSK signal.

Nevertheless, a method is needed to reduce the uncertainty in the time of zero-crossing in a digitally processed FSK signal. A more desirable value of uncertainty is on the order of 1% to 2%.

SUMMARY OF THE INVENTION

In a digital data communication receiver, an apparatus and a method are provided for estimating the time of zero-crossing between successive samples of a continuous frequency shift keyed (FSK) or like zero-crossing signal in a manner more accurate than is provided by sampling at a rate suited to preprocessing. The apparatus includes means for sensing a change in sign of the signal relative to successive samples and means responsive to the sensed sign change to interpolate between the values of the respective samples for indicating more accurately the time of occurrence of the zero-crossing prior to the second sample thereby demodulating the continuous signal.

In a specific embodiment, where the time interval of the basic clock is T=130 microseconds, an interpolated value of $T_0 = T/8$ is generated, which is equal to about 16 microseconds. Reducing the zero-crossing uncertainty to $T_0 = 16$ microseconds yields a distortion of less than about 2%. The moment of zero-crossing can thus be more accurately estimated by interpolation between the samples preceding and following a detected change of sign.

The invention will be better understood by reference to the following detailed description taken in connection with the accompanying drawings.

BRIEF DESCRIPTION OF THE DRAWINGS

FIG. 1 is a block diagram of a digital signal detector for FSK signals according to the invention.

FIG. 2 is a set of timing diagrams for a digitally sampled FSK signal detector according to the invention.

FIG. 3 is a schematic diagram of a digital signal detector according to the invention.

DETAILED DESCRIPTION OF SPECIFIC EMBODIMENTS

Various specific embodiments may be employed to accomplish the purposes of the invention, namely, to reduce the uncertainty of detecting a change in sign between two successive samples of a continuous signal wherein the samples are separated by a time interval T. In each instance, the embodiment interpolates between successive samples having opposite signs and divides the time interval T into corresponding subintervals $T_0$. The interpolated samples occurring each successive subinterval are then monitored for a sign change. A change in sign is indicated by a state change in an output signal thereby representing the demodulated signal.

Referring to FIG. 1, there is shown diagram of a digital signal detector 10 according to the invention. The detector 10 comprises a storage register 12, a comparator 14 and an interpolator 16, as hereinafter explained. The storage register 12 is operative to receive sampled input values of a continuous signal at each clock cycle of a clock 18. The sampled input values comprise a sign bit and one or more value bits, typically about eight bits in total.

The sampled input values are provided over input sign line 20 and input value bus line 22 to both the storage register 12 and to one input of the interpolator 16. The output of the storage register 12 is provided through an output sign line 24 and an output value bus line 26 to a second input 28 of the interpolator 16. The signals to the second input 28 are the same signals provided to the first input 23 but delayed by one clock interval.

The input sign line 20 and the output sign line 24 are also provided to inputs of the dual input sign comparator 14. The output of the sign comparator 14 is provided to an enable input 30 of the interpolator 16. The output terminal 32 of the interpolator 16 provides a single clock-controlled two state signal representing the demodulated data output. The input signal to the detector 10 is the output of a digital low pass filter representing a sampled eye pattern of a received analog signal.

Referring to FIG. 2, there is shown a set of timing diagrams illustrating the operation of the invention. In timing diagram I there is shown the continuous eye pattern signal versus time 34, a reconstructed eye pattern signal curve 36 delayed by one interval T and samples of the eye pattern signal x(n−2), x(n−1), x(n), x(n+1), x(n+2), x(n+3). The samples are shown at a scaled amplitude between +1 and −1.

The reconstructed curve between sample x(n−1) and x(n) can be approximated by a straight line originating at x(n−1). Employing the equation:

$$y(t) = A \cdot t + x(n-1)$$

Where A equals the magnitude and sign of the slope, subintervals $T_0$ can be constructed by dividing the interval T between x(n−1) and x(n) into N number of smaller time slots having a duration of T/N.

The slope A is given by the expression:

$$\frac{x(n) - x(n-1)}{T}$$

The change in the equation y(t) due to each subinterval $T_0$ is then given by the expression:

$$A \cdot T_0 = x(n) - x(n-1) \cdot \frac{T_0}{T}$$

This quantity remains constant throughout the period between samples x(n−1) and x(n) thereby yielding a more accurate estimation of the occurrence of a zero-crossing between the two samples than the time of sample x(n). The interpolator 16 (FIG. 1) is operative to estimate the time of zero-crossing when related circuitry, for example the sign comparator 14, detects successive samples of opposite sign. If successive samples of the same sign are not detected, the interpolator 16 is not employed.

The method according to the invention may be implemented in either random logic digital circuitry or algorithmically in a process-oriented microprocessor-based system. The steps of an appropriate algorithm are as follows:

1. If the value of the sign of x(n) equals the value of the sign of x(n−1), then received data is passed through unchanged.
2. Otherwise, compute the value of x(n)−x(n−1) (by adding the absolute values) and store as the value "change in x" in a first register.
3. Divide the value in the first register by the scaling value determined by the ratio of the sample clock rate to the interpolator clock rate. (If the ratio is an even power of the digital number base, division may be accomplished by a shift in the value places. Specifically, where the number base is binary digital and the ratio of the value of the sample clock to the interpolator clock is 8 to 1, division is accomplished by a right shift of three bits.) The value thus obtained is $A \cdot T_0$.
4. Place the value x(n−1) into an accumulator register.
5. Add to the accumulator register the contents of the first register (which has been right shifted as in Step 3) under high-speed clock control until the current sign of the value of the accumulator register is not equal to the value of the sign of the accumulator register during the previous clock cycle.
6. Thereupon change the state of the demodulator output at the current clock transition.

FIG. 3 illustrates one circuit implementation (with enumeration corresponding to FIG. 1). The interpolator 16 includes an arithmetic unit 38, a first multiplexer 50, an arithmetic accumulator 58, a second multiplexer 62, and a timer 68. The sampled input values on sign line 20 and value lines 22 are coupled to the storage register 12, for example an 8-bit storage register, and to one input port 23 of the arithmetic unit 38. The output of the storage register 12 through sign line 24 and value lines 26 is coupled to another input port 28 of the arithmetic unit 38. The arithmetic unit 38 is dedicated to subtracting the values received at its first port 23 from the value received at its second port 28 to provide a difference value at its output port 40. The more significant output bits of output port 40 are shifted toward the least significant bit by three bits and coupled to a first input port 42 of the first multiplexer 44. The vacated most significant bits are tied together to an appropriate logic level (for example to ground, assuming positive logic). The lesser significant bits are truncated. The bit shifting arrangement is the substantial equivalent of a divider 46.

The input sign line 20 and input value bus line 22 are also coupled to a second input port 48 of the first multiplexer 44. The first multiplexer 44 has its output port 50 coupled through a sign line 52 and value bus lines 54 to an input port 56 of the accumulator 58. The output sign bit of the accumulator 58 is coupled to a first input port 60 of the second multiplexer 62. The output sign line 24 is coupled to a second input port 64 of the second multiplexer 62. The output terminal of the second multiplexer 62 is the interpolator output port 32. The storage register input sign line 20 is coupled to a first input of the sign comparator 14 and the storage register output sign line 24 is coupled to the second input of the sign comparator 14. The output of the sign comparator 14 controls the timer 68, the outputs of which are determined by the state of the enable input 30. The timer 68 has outputs coupled to the storage register 12, the accumulator 58, the first multiplexer 44 and the second multiplexer 62.

In order to understand the operation of the elements of FIG. 3 in accordance with the invention, reference is made to FIG. 2 in connection with FIG. 3. A signal in the form of digital samples is applied to the input of the detector 10, the digital samples being points along the continuous eye pattern signal curve 34 (timing diagram I). The signal is delayed by the storage register 12 to produce a set of samples delayed by one interval clock cycle T relative to the detector input samples. The value of the sign of these two samples, namely the signal on input sign line 20 and the signal on output sign line 24, is applied to the sign comparator 14, the output of which is applied to the enable input 30 and appears in the form of a two state signal A (timing diagram II). The detection of unlike signs causes a change of state at the clock transition of the sample clock line signal B (timing diagram III). Signal B out of the timer 68 toggles the storage register 12 and clears the accumulator 58. In response to the change of state indicated by signal A, the second multiplexer 62 switches its input from the output sign line 24 to the accumulator output sign line applied at its input 60, (timing diagram II) under control of the signal C (diagram IV) out of the timer 68. The accumulator 58 is thus cleared and ready to be loaded and its output clocked through the second multiplexer 62.

The interpolator clock signal (signal D of timing diagram V), which is operative at a multiple of the sample clock with intervals $T_0$ then begins to cycle the accumulator 58. On the first clock cycle, the value x(n)

from input value line 22 and input sign line 20 is directed through the first multiplexer 44 into the accumulator 58, as indicated by state 1 of signal E (timing diagram VI). At the next clock cycle, however, under control of the timer 68, the output of the multiplexer 44 is gated from the input port 42, as indicated by state 0 of signal E. The value appearing at input 42 of the multiplexer 44 is then repeatedly added to the current contents of the accumulator 58 until such time as the sign changes. (In this example, it is assumed that the sample value is provided continuously through the input to the detector 10. A sample storage register 51 at the output of the previous stage—represented in phantom—is a typical mechanism. Alternatively, the value of the sample is stored in such a sample register at the input of the detector 10.) The value in the accumulator is, for example, converged toward zero from the initial value applied through the second port 48 of the multiplexer 44, and upon the accumulator value crossing zero, the sign of the accumulator contents changes. This change in sign indicating a zero-crossing is provided at the output port 32 of the second multiplexer 62. In the detector output (signal F of timing diagram VII), state change occurs at the clock transition of the subinterval k (diagrams I and VII) at which the interpolated value crosses the zero reference.

The invention has now been explained with reference to specific embodiments. Other embodiments will be apparent to those of ordinary skill in this art. It is therefore not intended that this invention be limited except as indicated by the appended claims.

We claim:

1. An apparatus for processing a plurality of digital values in a sequence of discrete samples of a continuous signal in a digital data communication receiver, each of said discrete samples being separated by a sampling interval, said apparatus comprising:
   means for comparing a first discrete sample of said sequence with a second subsequent discrete sample of said sequence to sense for a change in sign between said first and second samples;
   means responsive to a change in sign between said first and second samples for interpolating between values of said first sample and said second sample, which means for interpolating generates a timing signal for estimating the time of occurrence of a zero-crossing of said continuous signal prior to said second sample;
   clock means for establishing a plurality of subintervals, each of which is a fraction of said sampling interval;
   the means for comparing including means for subtracting the value of said first sample from the value of said second sample to produce an interval difference value;
   means coupled to said subtracting means for dividing said interval difference value into a number of subinterval difference values each of which is representative of the fractional change of said interval difference value during each said subinterval;
   means responsive to said clock means for repeatedly summing the value of a subinterval difference value and the sum of said first sample and previously summed subinterval difference values in order to generate interpolated values; and
   means responsive to said summing means for indicating a zero-crossing of said continuous signal upon occurrence of a change in sign between two successive interpolated values.

2. The apparatus according to claim 1 including means comprising parallel digital storage register means for storing a first sample prior to its being subtracted from a second sample.

3. The apparatus according to claim 1 wherein said summing means comprises parallel digital accumulating register means.

4. The apparatus according to claim 1 wherein the ratio of said sampling interval to a subinterval is a power of the digital numbering base of said digital apparatus and wherein said dividing means comprises means for displacing said interval difference value to a lesser significant place to establish said subinterval difference values.

5. The apparatus according to claim 4 wherein said digital base is binary and said subinterval difference values are no greater than one-eight of said interval difference value and wherein said clock means generates a subinterval clock signal at at least eight times per interval and wherein said dividing means comprises means for shifting the interval difference value by at least three binary bits toward lesser significant bits.

6. The apparatus according to claim 1 further including means for multiplexing an output signal of said storing means and an output signal of said summing means such that said processing apparatus is operative to provide a timing signal only when a change of sign is sensed by said comparing means.

7. A method for processing a plurality of digital values in a sequence of discrete samples of a continuous signal in a digital data communication receiver, said samples being separated in time by a sampling interval, said method comprising the steps of:
   comparing a first sample in said sequence with a second subsequent sample to sense a change in sign relative to a zero reference;
   interpolating between values of said first sample and said second sample to estimate the time of occurrence of a zero-crossing of the continuous signal prior to said second sample;
   generating a timing signal for estimating the time of occurrence of said zero-crossing;
   said interpolating step comprising:
     subtracting the value of said first sample from the value of said second sample to produce an interval difference value signal for each sampling interval;
     digitally dividing the value of said interval difference value signal into a subinterval difference value signal representative of the fractional change of said interval difference value during a subinterval of said sampling interval;
     repeatedly summing the value of said subinterval difference value signal with the sum of the value of said first sample and previously summed subinterval difference values at a rate equal to the product of the interval sampling rate and the ratio of said sampling interval to said subinterval to generate an interpolated value signal; and
   generating a zero-crossing signal upon a change of sign of said interpolated value signal.

8. The method according to claim 7 further including the steps of multiplexing a signal representative to said stored first sample and said interpolated value signal such that said interpolated value signal is provided only when a change of sign is sensed.

* * * * *